US008886803B1

(12) United States Patent
Kandekar et al.

(10) Patent No.: US 8,886,803 B1
(45) Date of Patent: Nov. 11, 2014

(54) DYNAMIC QUERY RESPONSE IN A DISTRIBUTED NETWORK

(75) Inventors: Kunal Kandekar, Raleigh, NC (US);
Richard J. Walsh, Raleigh, NC (US);
James Evans, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 747 days.

(21) Appl. No.: 11/858,276

(22) Filed: Sep. 20, 2007

(51) Int. Cl.
*G06F 15/173* (2006.01)
(52) U.S. Cl.
USPC ............ 709/226; 709/201; 709/224; 709/229
(58) Field of Classification Search
USPC .................... 709/201, 231; 707/3, 6, 7, 10
See application file for complete search history.

(56) References Cited

U.S. PATENT DOCUMENTS

| | | | |
|---|---|---|---|
| 5,694,591 A * | 12/1997 | Du et al. ............................... | 1/1 |
| 6,795,817 B2 * | 9/2004 | Agarwal et al. ....................... | 1/1 |
| 6,993,587 B1 | 1/2006 | Basani et al. | |
| 7,451,131 B2 * | 11/2008 | Curtis et al. ........................ | 707/3 |
| 2003/0126245 A1 | 7/2003 | Feltin et al. | |
| 2003/0158839 A1 | 8/2003 | Faybishenko et al. | |
| 2004/0019657 A1 | 1/2004 | Akiyama | |
| 2005/0021394 A1 | 1/2005 | Miedema et al. | |
| 2005/0021758 A1 | 1/2005 | White | |
| 2005/0185663 A1 | 8/2005 | Lehtonen | |
| 2005/0203890 A1 * | 9/2005 | Chen et al. ......................... | 707/3 |
| 2005/0207354 A1 * | 9/2005 | Nekovee et al. ............... | 370/260 |
| 2007/0050761 A1 | 3/2007 | Hester et al. | |
| 2007/0058627 A1 | 3/2007 | Smith et al. | |
| 2008/0027923 A1 * | 1/2008 | George et al. ....................... | 707/4 |
| 2008/0126308 A1 * | 5/2008 | Wooldridge et al. ............. | 707/3 |

FOREIGN PATENT DOCUMENTS

| | | |
|---|---|---|
| EP | 1 176 828 A2 | 7/2001 |
| EP | 1 443 704 A1 | 8/2004 |
| WO | WO 2004/002048 A1 | 12/2003 |
| WO | WO 2007/027361 A2 | 3/2007 |

OTHER PUBLICATIONS

Wolfgang Nejdl et al., "Super-Peer-Based Routing Strategies for RDF-Based Peer-to-Peer Networks," Nov. 18, 2003.
"P2P and Content Distribution," PowerPoint Presentation, http://www.list.gmu.edu/zhang/isa767/p2p-6.pdf, Oct. 25, 2005.
Yingwu Zhu et al., "A Super-Peer Based Lookup in Structured Peer-to-Peer Systems," 2003.
Beverly Yang, Hector Garcia-Molina, "Designing A Super-Peer Network," ICDE, p. 49, 19th International Conference on Data Engineering (ICDE'03), 2003.
Juan Li, ECSP: An Efficient Clustered Super-Peer Architecture for P2P Networks (The University of British Columbia 2003) (Aug. 2003).

(Continued)

*Primary Examiner* — Mohamed Ibrahim
(74) *Attorney, Agent, or Firm* — Withrow & Terranova, PLLC (57) ABSTRACT

A dynamic query response scheme for a distributed network is provided. In one embodiment, the distributed network is a peer-to-peer (P2P) network including a number of peer nodes. In general, peer nodes delay their query responses, address their query responses, or both delay and address their query responses dynamically to avoid feedback implosion. In one embodiment, the peer nodes delay their query responses, address their query responses, or both delay and address their query responses based on one or more quality metrics calculated for their query responses.

22 Claims, 5 Drawing Sheets

(56) References Cited

OTHER PUBLICATIONS

Young-Bae Ko et al., "A Multicast Protocol for Physically Hierarchical Ad Hoc Networks," 2003.
Gnutella—Wikipedia, http://en.wikipedia.org/wiki/Gnutella.
Gnutella 2—Wikipedia, http://en.wikipedia.org/wiki/Gnutella2.
Sally Floyd et al., "A Reliable Multicast Framework for Light-weight Sessions and Application Level Framing," IEEE/ACM Transactions on Networking, Nov. 1996.
Sally Floyd et al., "A Reliable Multicast Framework for Light-weight Sessions and Application Level Framing," IEEE/ACM Transactions on Networking, Dec. 1997, vol. 5, No. 6, pp. 784-803.

* cited by examiner

DYNAMIC QUERY RESPONSE IN A DISTRIBUTED NETWORK

FIELD OF THE INVENTION

The present invention relates to a query response scheme in a distributed network.

BACKGROUND OF THE INVENTION

Next-generation multicast-based Peer-to-Peer (P2P) networks offer the possibility of massively scalable distributed search networks. One such P2P network architecture is disclosed in U.S. patent application Ser. No. 11/609,514, entitled MULTICAST QUERY PROPAGATION SCHEME FOR A PEER-TO-PEER (P2P) NETWORK, which was filed on Dec. 12, 2006 and is hereby incorporated herein by reference in its entirety. One issue with these next-generation multicast-based P2P networks is the possibility of "response implosion," where a node issuing or relaying a query for very popular content is bombarded with unicast responses from all of the nodes sharing that content. In addition, response implosion may lead to congestion in the intermediate network near the relaying node leading to loss of packets. Since the packets are typically User Datagram Protocol (UDP) packets, the loss of packets results in permanent loss of responses due to the congestion. Further, if a reliable UDP scheme is used instead, the subsequent retransmissions due to the loss of packets may lead to even more congestion. Thus, there is a need for an improved query response scheme that alleviates or eliminates response implosion.

SUMMARY OF THE INVENTION

The present invention provides a dynamic query response scheme for a distributed network. In one embodiment, distributed network is a peer-to-peer (P2P) network including a number of peer nodes. In general, peer nodes delay their query responses, address their query responses, or both delay and address their query responses dynamically to avoid feedback implosion. In one embodiment, the peer nodes delay their query responses, address their query responses, or both delay and address their query responses based on one or more quality metrics calculated for their query responses.

More specifically, in one embodiment, a peer node first applies a received query to shared content stored locally in order to identify one or more results to the query. The shared content may be stored locally or remotely. The peer node then calculates, or otherwise determines, a quality of the results. One or more quality metrics may be used to represent the quality of the results. In general, the quality of the results is indicative of a degree to which the results match the query. For example, if the query contains multiple keywords, the quality metric representing the quality of the results may be a number of matching keywords. Once the one or more quality metrics are determined, the peer node schedules the results for response to an originating peer node issuing the query based on the one or more quality metrics and a response plan. The response plan generally defines how the peer node is to delay and/or address the response to the query based on the quality of the results. Once the results are scheduled for response, the peer node then generates and sends a response, including the results, at a time determined based on the quality of the results and the response plan, addressed to a node in the P2P network selected based on the quality of the results and the response plan, or both.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
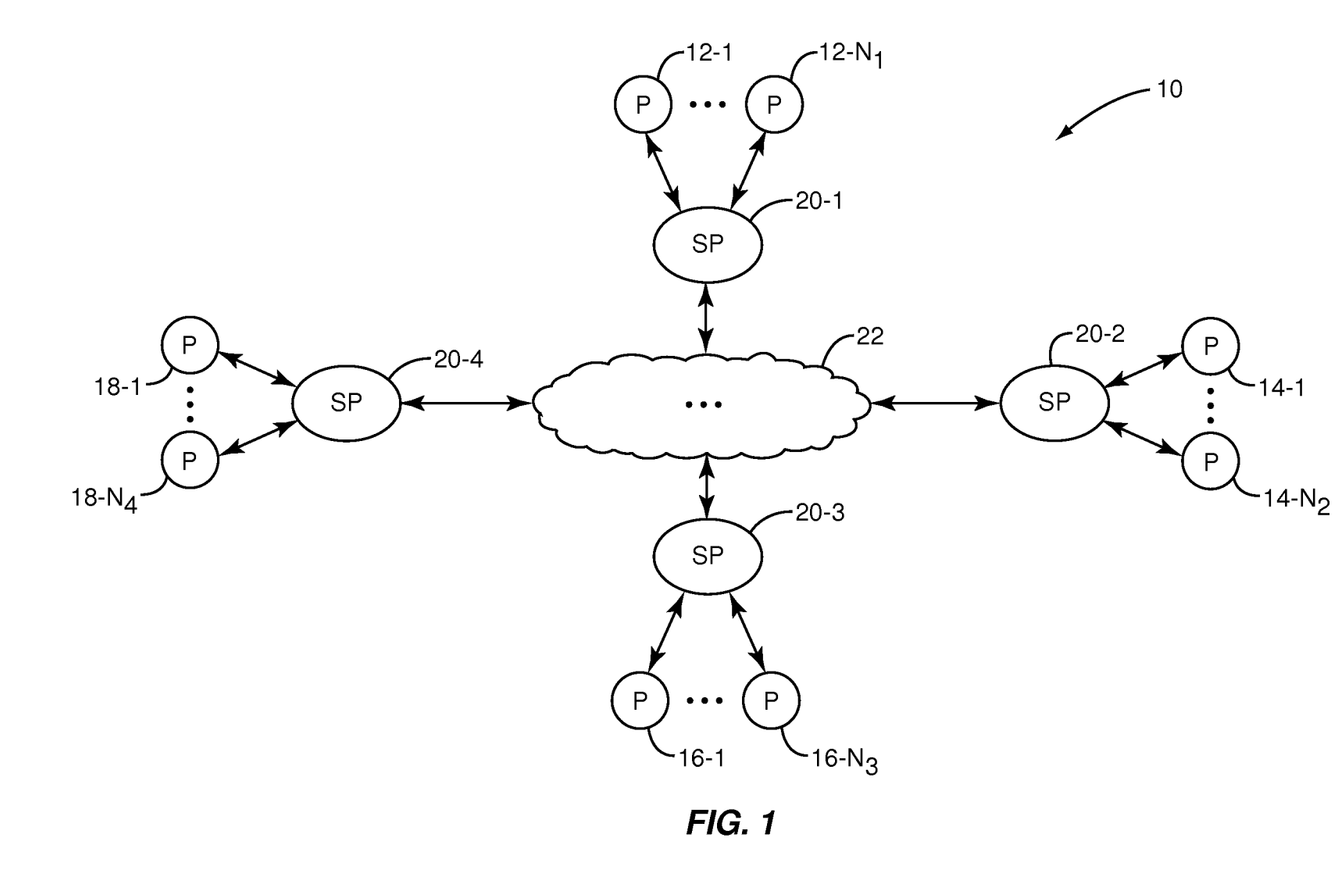
FIG. 1 illustrates a Peer-to-Peer (P2P) network incorporating a dynamic query response scheme according to one embodiment of the present invention.

FIG. 1 illustrates a Peer-to-Peer (P2P) network 10 implementing a dynamic query response scheme according to one embodiment of the present invention. While the discussion herein focuses on the P2P network 10, the present invention is not limited thereto. The present invention is equally applicable to query responses in any type of distributed network. The P2P network 10 includes a number of peer nodes 12-1 through 12-$N_1$, 14-1 through 14-$N_2$, 16-1 through 16-$N_3$, and 18-1 through 18-$N_4$; and a number of super peer nodes 20-1 through 20-4. Network cloud 22 is shown to indicate that there may be additional nodes in the P2P network 10 interconnecting the super peer nodes 20-1 through 20-4. The P2P network 10 is generally an overlay network formed on top of any type of Wide Area Network (WAN) or Local Area Network (LAN) or any combination of WANs and/or LANs, which may include wired components, wireless components, or both wired and wireless components.

In general, the peer nodes 12-1 through 12-$N_1$, 14-1 through 14-$N_2$, 16-1 through 16-$N_3$, and 18-1 through 18-$N_4$ may be any type of device having networking capabilities. For example, each of the peer nodes 12-1 through 12-$N_1$, 14-1 through 14-$N_2$, 16-1 through 16-$N_3$, and 18-1 through 18-$N_4$ may be a personal computer, a mobile telephone, a set-top box having Digital Video Recording (DVR) capabilities, or the like.

The super peer nodes 20-1 through 20-4 are peer nodes that have been selected or otherwise identified as super peer nodes for the P2P network 10. The super peer nodes 20-1 through 20-4 generally operate to connect the peer nodes 12-1 through 12-$N_1$, 14-1 through 14-$N_2$, 16-1 through 16-$N_3$, and 18-1 through 18-$N_4$ to the P2P network 10. In this example, the super peer node 20-1 serves the peer nodes 12-1 through 12-$N_1$, the super peer node 20-2 serves the peer nodes 14-1 through 14-$N_2$, the super peer node 20-3 serves the peer nodes 16-1 through 16-$N_3$, and the super peer node 20-4 serves the peer nodes 18-1 through 18-$N_4$.

In one embodiment, queries are propagated in the P2P network 10 in the manner described in commonly owned and assigned U.S. patent application Ser. No. 11/609,514, entitled MULTICAST QUERY PROPAGATION SCHEME FOR A PEER-TO-PEER (P2P) NETWORK, which was filed on Dec. 12, 2006 and has been incorporated herein by reference in its entirety. In general, the super peer node 20-1 and the peer nodes 12-1 through 12-$N_1$ form first peer group. The super peer node 20-1 allocates two Source-Specific Multicast (SSM) channels for the first peer group, where one of the SSM channels operates as a control channel for the first peer group and the other SSM channel operates as a query channel for the first peer group. The super peer node 20-2 and the peer nodes 14-1 through 14-$N_2$ form a second peer group. The super peer node 20-2 allocates two SSM channels for the second peer group, where one of the SSM channels operates as a control channel for the second peer group and the other SSM channel operates as a query channel for the second peer group. The super peer node 20-3 and the peer nodes 16-1 through 16-$N_3$ form a third peer group. The super peer node 20-3 allocates two SSM channels for the third peer group, where one of the SSM channels operates as a control channel for the third peer group and the other SSM channel operates as a query channel for the third peer group. Lastly, the super peer node 20-4 and the peer nodes 18-1 through 18-$N_4$ form a fourth peer group. The super peer node 20-4 allocates two SSM channels for the fourth peer group, where one of the SSM channels operates as a control channel for the fourth peer group and the other SSM channel operates as a query channel for the fourth peer group. In a similar fashion, a third level peer node (not shown) may allocate two SSM channels for the super peer nodes 20-1 through 20-4, which are referred to herein as a super peer group, where one of the SSM channels operates as a control channel for the super peer group and the other SSM channel operates as a query channel for the super peer group.

Thus, when, for example, the peer node 12-1 desires to issue a query, the query is multicast via the query channel for the first peer group. In response, the peer nodes 12-2 through 12-$N_1$ and the super peer node 20-1 process and respond to the query if appropriate. The super peer node 20-1 also forwards the query to the other super peer nodes 20-2 through 20-4 via the query channel for the super peer group. The super peer nodes 20-2 through 20-4 then process the query and forward the query to the peer nodes 14-1 through 14-$N_2$, 16-1 through 16-$N_3$, and 18-1 through 18-$N_4$ via the query channels for the corresponding peer groups. In this manner, the query is propagated throughout the P2P network 10. According to one embodiment of the present invention, responses to the query are returned to the peer node 12-1 according to the dynamic response scheme discussed below.

Note that the query propagation scheme discussed above is exemplary and not intended to limit the scope of the present invention. Other query propagation schemes may be used. For example, the peer nodes 12-1 through 12-$N_1$, 14-1 through 14-$N_2$, 16-1 through 16-$N_3$, and 18-1 through 18-$N_4$ may alternatively provide queries to their respective super peer nodes 20-1 through 20-4 and receive queries from their respective super peer nodes 20-1 through 20-4 via unicast communication channels. The super peer nodes 20-1 through 20-4 may use either unicast or multicast communication to propagate the queries between one another.

Figure 2:
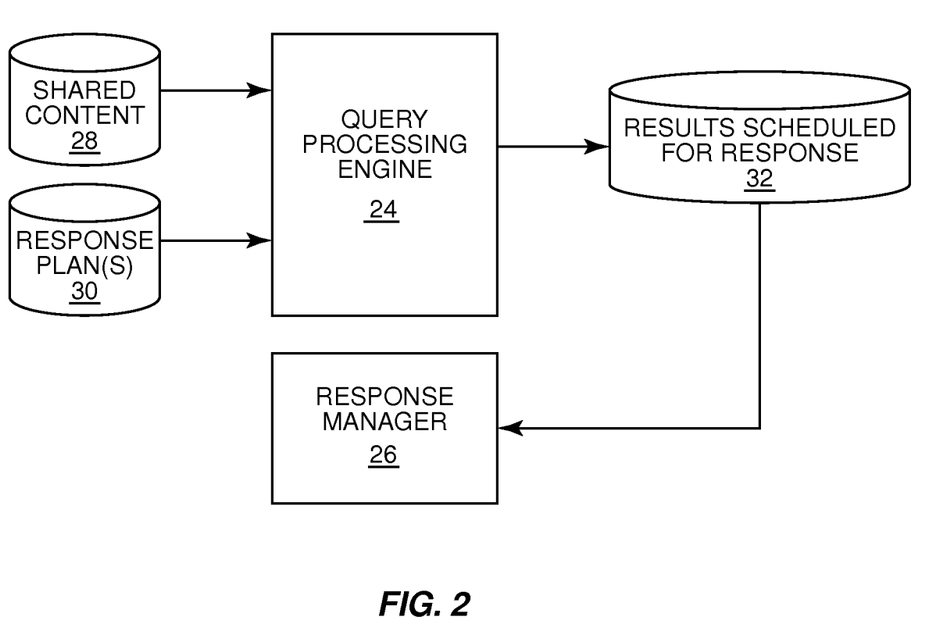
FIG. 2 is a functional block diagram of one of the peer nodes of FIG. 1 according to one embodiment of the present invention.

FIG. 2 is a block diagram of the peer node 12-1 of FIG. 1 according to one embodiment of the present invention. This discussion is equally applicable to the other peer nodes 12-2 through 12-$N_1$, 14-1 through 14-$N_2$, 16-1 through 16-$N_3$, and 18-1 through 18-$N_4$ and to the super peer nodes 20-1 through 20-4. In general, the peer node 12-1 includes a query processing engine 24 and a response manager 26. In addition, the peer node 12-1 hosts shared content 28. The shared content 28 may include one or more digital content items such as, for example, songs, videos, pictures, slideshows, documents, or the like. Note that the shared content 28 may be stored locally, as illustrated, or remotely.

The query processing engine 24 and the response manager 26 are preferably implemented in software but may alternatively be implemented in hardware or a combination of software and hardware. As discussed below, the query processing engine 24 generally operates to process queries received from other peer nodes in the P2P network 10 to identify results satisfying the queries and schedule the results for response based on one or more corresponding response plans 30. The query processing engine 24 schedules results for each particular response by determining a response delay for the response, selecting a response node to which to address the response, or both to provide results scheduled for response 32. The response manager 26 processes the results scheduled for response 32 to generate and send responses at the specified time and/or to the specified address.

Figure 3:
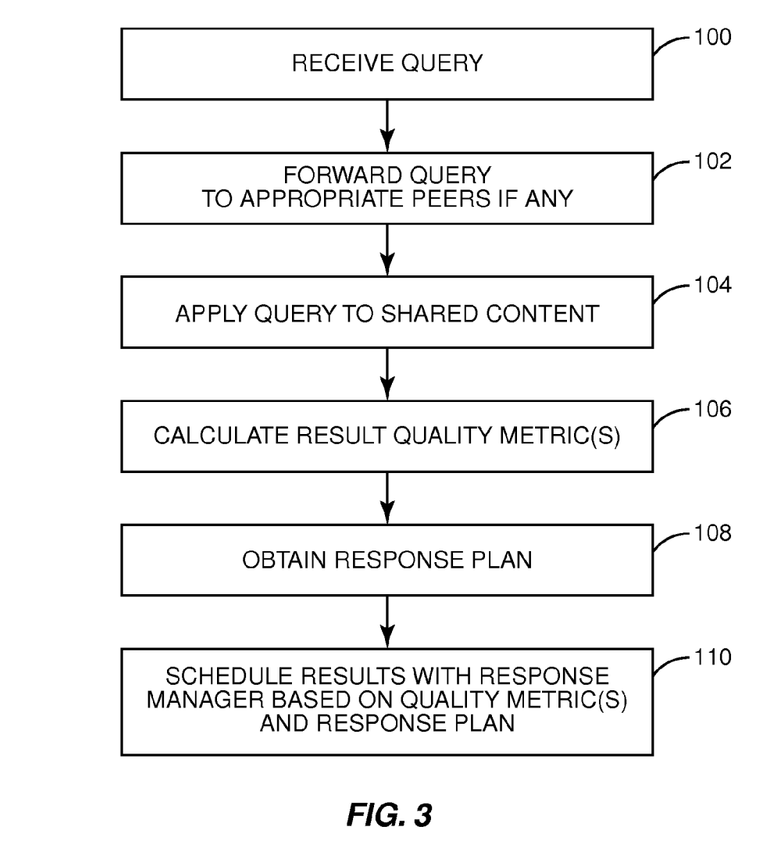
FIG. 3 is a flow chart illustrating the operation of the query processing engine of FIG. 2 according to one embodiment of the present invention.

FIG. 3 is a flow chart illustrating the operation of the query processing engine 24 in more detail according to one embodiment of the present invention. First, the query processing engine 24 receives a query from an issuing, or originating, peer node (step 100). For this example, assume that the peer node 12-1 is the receiving peer node and that the peer node 14-1 is the issuing peer node. Upon receiving the query, the query processing engine 24 forwards the query to other appropriate peer nodes, if any (step 102). In this example, the peer node 12-1 is not responsible for forwarding the query to any other peer nodes. Note that step 102 may be performed in parallel with steps 104-110 or after steps 104-110. The query processing engine 24 then applies the query to the shared content 28 (step 104). More specifically, the query may include, for example, one or more keywords or combinations of keywords. The query processing engine 24 compares the query to, for example, file names of the digital content items of the shared content 28, directory names in which the digital content items are stored, metadata describing the digital content items, or the like. The metadata describing the digital content items may be stored as part of the digital content item files, in associated application files, in an associated database, or the like. By applying the query to the shared content 28, the query processing function 24 generates one or more results satisfying the query. As used herein, a "result" is information identifying or referencing one of the shared content items from the shared content 28 satisfying the query.

Next, the query processing engine 24 calculates, or otherwise determines, one or more quality metrics for the results satisfying the query (step 106). Generally, the one or more quality metrics define how well a given result or group of results satisfy the query. The one or more quality metrics may depend on the format of the query. For example, if the query includes a number of keywords, the one or more quality metrics may include, for example, number of matching keywords, percentage of matching keywords, or the like. Additional or alternative types of quality metrics will be apparent to one of ordinary skill in the art upon reading this disclosure.

If the results include more than one result, the query processing engine 24 may process each result individually such that each result will be returned via a separate response, group the results based on quality such that each group of results having the same or similar quality will be returned via a separate response, or compute an overall quality metric for the results such that all of the results will be returned via a single response. The overall quality metric may be, for example, a statistical average of the quality metrics of the results, a maximum quality metric of all of the results, or the like. Whether the results are processed individually, in quality groups, or as a whole may be static or chosen dynamically. For example, if the result set is very large, the results may be processed in quality groups. Alternatively, if the result set is very small, the results may be processed as a whole. Further, whether the results are processed individually, in quality groups, or as a whole may be defined by the response plan for the query.

The query processing engine 24 also obtains a response plan for the query (step 108). The response plan is generally a set of instructions or rules defining how to respond to the query based on the one or more quality metrics. The response plan may also include additional information such as, for example, a desired format in which to provide the results of the query, protocol information, credential requirements for response such as a requirement that a response be digitally signed before being sent, or the like. The response plan may be, for example, provided by the issuing peer node 14-1 as part of the query or in association with the query, obtained from a remote source using, for example, a reference included in the query or in association with the query, or the like. Alternatively, the response plan may be a system wide response plan for all queries or for one or more query types. Note that if a response plan is provided in association with a query and the response plan works well, the issuing peer node may distribute the response plan to other peer nodes as a recommended response plan for future queries.

In one embodiment, the response plan includes a maximum and minimum delay for each of a number of quality ranges and/or information identifying a response node to which responses are to be sent for each of the number of quality ranges. For example, assume that the quality metric is a percentage reflecting the degree to which the result satisfies the query. The response plan may state that responses including results in the quality range of 76%-100% are to have a delay of 0-0.5 seconds and be addressed to the initiating peer node 14-1, responses including results in the quality range of 51%-75% are to have a delay of 1-2 seconds and be addressed to the super peer node 20-2 of the issuing peer node 14-1, responses including results in the quality range of 11%-50% are to have a delay of 3-5 seconds and be addressed to the super peer node 20-1 of the receiving peer node 12-1, and that all other results be dropped. In order to enable the receiving peer node 12-1 to address responses to the appropriate nodes, in one embodiment, the query originally includes the address of the issuing peer node 14-1. As the query is propagated to the receiving peer node 12-1, the intermediate nodes, which in this example are the super peer nodes 20-1 and 20-2, may append their addresses to the query.

The exemplary response plan described above is not intended to limit the scope of the present invention. For example, in addition to quality, the delay time may be dependant on an estimated round trip time (RTT) between nodes. Further, the address to which to respond may be defined using one or more formulas or rules. For example, if there are intermediary nodes between the super peer nodes 20-1 and 20-2 of the receiving peer node 12-1 and the issuing peer node 14-1, respectively, the response plan may provide that responses for results in the quality range of 80%-100% be addressed to the issuing peer node 14-1, responses for results in the quality range of 60%-79% be addressed to a node a third of the way along the propagation path, responses for results in the quality range of 40%-59% be addressed to a node two-thirds of the way along the propagation path, responses for results in the quality range of 20%-39% be addressed to the super node 20-1 of the receiving peer node 12-1, and results in the quality range of 0%-19% be dropped. Still further, the response plan may be varied or modified based on current network conditions.

Lastly, the query processing engine 24 schedules the results with the response manager 26 based on the one or more quality metrics and the response plan (step 110). For this example, assume that both the delay and response address for the responses are controlled. Thus, if the results are to be processed individually, the query processing engine 24 determines a delay and an address to which the response is to be sent for each result based on the one or more quality metrics for the result and the response plan. Note that the results may optionally be grouped based on the address to which they are to be sent in which case the delay for the corresponding response may be determined based on a minimum quality level, maximum quality level, or average quality level for the group. Further, while the discussion herein focuses on sending the response to a single address, the response may alternatively be sent to multiple addresses for redundancy. If the results are to be processed in quality groups, the query processing engine 24 determines a delay and an address to which the response is to be sent for each quality group based on the one or more quality metrics for the results in the quality group and the response plan. Note that the quality groups may be divided into a number of sub-groups, where each sub-group is to be sent via a separate response if, for example, the groups are large. As a final example, if the results are to be processed as a whole, the query processing engine 24 determines a delay and an address to which the response including all of the results is to be sent based on the overall quality metric for the results and the response plan.

In one embodiment, for a particular response, the response plan includes a maximum and a minimum delay for each of a number of quality ranges. Thus, for a particular response, the delay for that response may be generated randomly using the maximum and minimum delays for the corresponding quality range and an upper and lower limit for the delay. For example, if the results for a response are of high quality, the response plan may provide that the delay be in the range of 0-1 seconds. As such, the query processing engine 24 may generate a random delay for the response within the range of 0-1 seconds. In an alternative embodiment, all responses having results from a particular quality range may be assigned the same delay.

The manner in which the results are scheduled for response may vary depending on the particular implementation. For example, a schedule defining the time at which the responses for the results are to be sent and/or the address(es) to which the responses are to be sent may be stored in association with the results. As another example, the results may be stored in a data structure, such as one or more lists, in such a manner as to indicate the time and/or address(es) to which the corresponding results are to be sent. These two examples are not intended to limit the scope of the present invention. One of ordinary skill in the art will recognize various alternative schemes for scheduling the results for response.

Note that, for the super peer nodes 20-1 through 20-4, the query processing engine 24 may wait to perform steps 104-110, steps 106-110, steps 108-110, or step 110 until after results, if any, are received from downstream peer nodes. In one embodiment, the super peer nodes 20-1 through 20-4 are configured to wait until responses are received from the downstream peer nodes before sending any of its own results. In another embodiment, the super peer nodes 20-1 through 20-4 are configured to send, for example, high quality results immediately and to wait until responses are received from the downstream peer nodes before sending all other results. Rather than being configured, whether or not the super peer nodes 20-1 through 20-4 wait for responses from the downstream peer nodes may be defined by the response plan for the query. Note that if the super peer nodes 20-1 through 20-4 are to wait for responses of the downstream peer nodes, upon receiving those responses, the super peer nodes 20-1 through 20-4 may aggregate the received results with its own results and schedule a single response for the aggregate results based on the response plan and, for example, an overall quality metric for the aggregate results. Alternatively, the super peer nodes 20-1 through 20-4 may aggregate the results with its own results and process the results individually or in quality groups.

Figure 4:
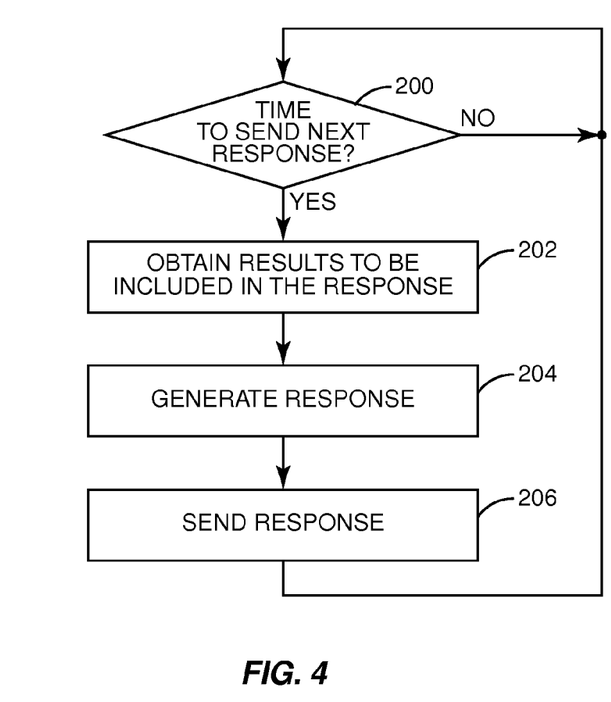
FIG. 4 is a flow chart illustrating the operation of the response manager of FIG. 2 according to one embodiment of the present invention.

FIG. 4 is a flow chart illustrating the operation of the response manager 26 in more detail according to one embodiment of the present invention. First, the response manager 26 determines whether it is time to send a next response for the scheduled results (step 200). For this discussion, it is assumed that both response delay and response address are scheduled, or controlled, by the query processing engine 24 based on the response plan and the quality metrics. If it is not time to send the next response, the response manager 26 waits until it is time to send the next response. When it is time to send the next response, the response manager 26 obtains the one or more results to be sent in the response (step 202) and then generates the response addressed to the node in the P2P network 10 determined by the query processing engine 24 (step 204). Once the response is generated, the response manager 26 sends the response to the node in the P2P network 10 to which the response is addressed (step 206). At this point, the process returns to step 200 and is repeated. Note that the response manager 26 may optionally collapse results to multiple queries that are scheduled to be sent at the same time or approximately the same time and sent to the same address into a single response.

The discussion of FIG. 4 above focuses on the scenario where both the delay for the response and the address to which the response is sent are scheduled by the query processing engine 24 based on the response plan and quality metrics. However, the present invention is not limited thereto.

More specifically, in a first alternative embodiment, the query processing engine 24 may schedule only the delay based on the response plan and quality metrics. In this case, the response manager 26 may generate the response such that the response is addressed according to a default response propagation path. For example, the default propagation path may provide that the response is to be provided to the super peer node 20-1 of the receiving peer node 12-1, where the super peer node 20-1 then forwards the response to the issuing peer node 14-1 or the super peer node 20-2 of the issuing peer node 14-1 depending on the default response propagation path. As an alternative, the response manager 26 may randomly address the response to the issuing peer node 14-1 or one of the intermediate nodes between the issuing peer node 14-1 and the receiving peer node 12-1 in the P2P network 10. More specifically, in one embodiment, the response manager 26 may randomly select the issuing peer node 14-1, the super peer node 20-2 of the issuing peer node 14-1, or the super peer node 20-1 of the receiving peer node 12-1 and address the response to the selected node. Rather than selecting the response node randomly, the response manager 26 may use, for example, a round-robin selection scheme, a weighting scheme where nodes are weighted based on previous traffic sent to the nodes, or the like. It should also be noted that in some P2P networks, the query may be propagated to the receiving peer node 12-1 via multiple propagation paths. In this case, the query processing engine 24 and the response manager 26 may use a select one of the propagation paths for the response(s) to the query. If there are multiple responses, the query processing engine 24 may alternatively balance the responses across the multiple propagation paths.

In a second alternative embodiment, the query processing engine 24 may schedule only the address to which the response is to be sent based on the response plan and the quality metrics. In this case, the response may, for example, be sent in First-In-First-Out (FIFO) manner. As an alternative, rather than sending the responses in a FIFO manner, the responses may be delayed a random amount of time within predetermined limits from the time of receiving the query.

Figure 5:
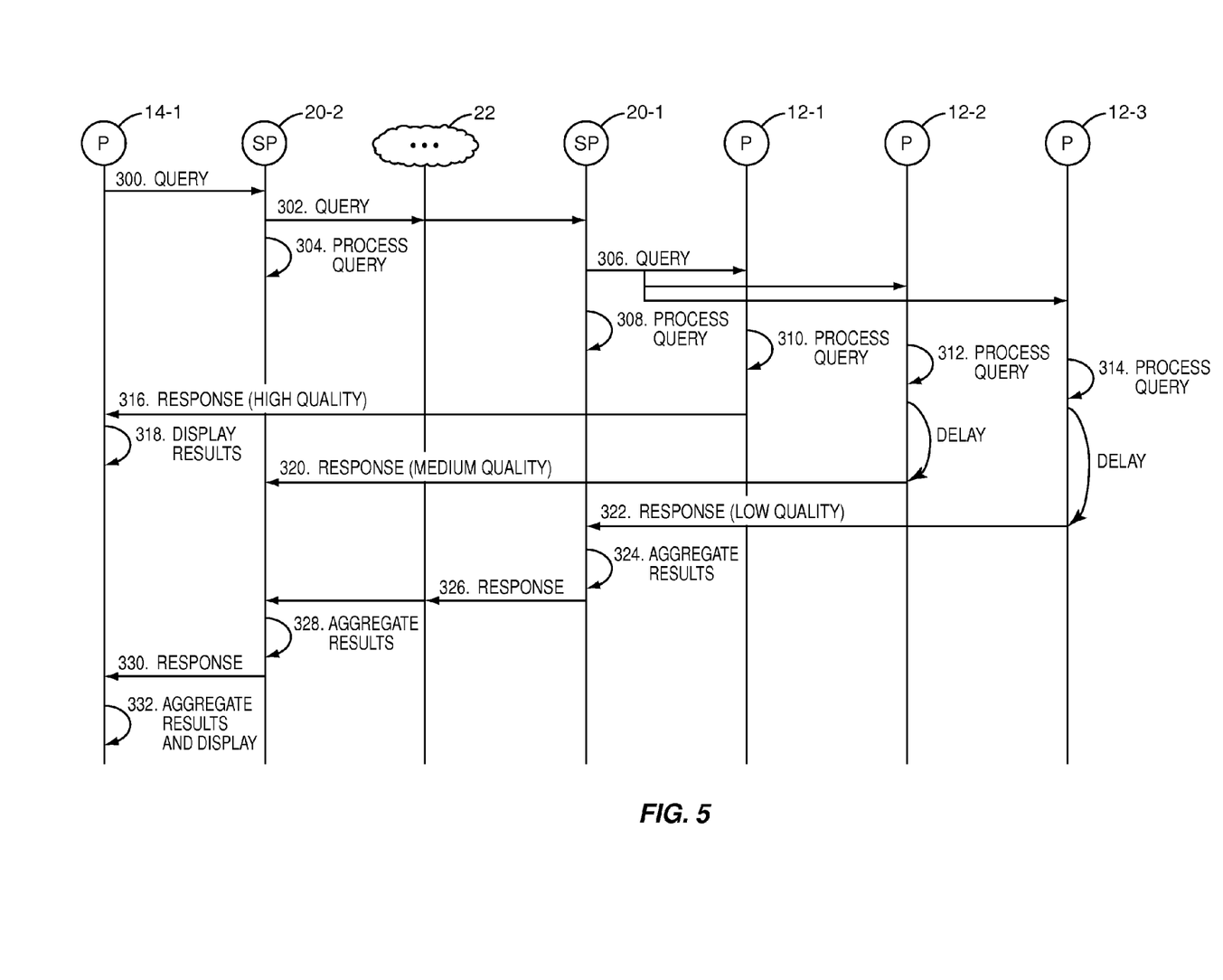
FIG. 5 illustrates the operation of the P2P network of FIG. 1 according to one embodiment of the present invention.

FIG. 5 illustrates the operation of the P2P network 10 of FIG. 1 according to one embodiment of the present invention. First, the peer node 14-1, which is referred to herein as the issuing peer node, issues a query by providing the query to the super peer node 20-2 (step 300). The super peer node 20-2 then forwards the query to the super peer node 20-1 (step 302). Note that, in one embodiment, the super peer node 20-2 multicasts the query to the other super peer nodes 20-1, 20-3, and 20-4. The other super peer nodes 20-3 and 20-4 are not illustrated for purposes of clarity and ease of discussion. However, it should be appreciated that the super peer node 20-2 may forward the query to more than just the super peer node 20-1. Also, while not illustrated, in the embodiment where the peer node 14-1 issues the query via a multicast channel, the peer nodes 14-2 through 14-$N_2$ may also receive the query from the issuing peer node 14-1 via the multicast channel. Still further, step 302 may alternatively be performed in parallel with the subsequent steps or after the subsequent steps.

In addition to forwarding the query, the super peer node 20-2 processes the query by applying the query to its shared content to identify results satisfying the query, calculating one or more quality metrics for the results, and obtaining a response plan for the query (step 304). Note that in this example, the super peer node 20-2 waits on results from downstream nodes before scheduling and sending its own results. As discussed above, the super peer nodes 20-1 through 20-4 may be configured to wait for the results of downstream peer nodes before sending results regardless of quality. Alternatively, the super peer nodes 20-1 through 20-4 may be configured to wait for results of downstream peer nodes unless its results are high quality. Rather than be configured to operate in this manner, the response plan for the query may state whether the super peer nodes 20-1 through 20-4 are to wait for the responses of downstream nodes before sending their own results.

Upon receiving the query, the super peer node 20-1 forwards the query to the peer nodes 12-1 through 12-3 (step 306). While the three peer nodes 12-1 through 12-3 are shown in this example, the super peer node 20-1 may serve any number of peer nodes. In one embodiment, the super peer node 20-1 forwards the query to the peer nodes 12-1 through 12-3, which are referred to herein as receiving peer nodes, via a multicast channel. However, the present invention is not limited thereto. In this embodiment, the super peer node 20-1 then processes the query by applying the query to its shared content to identify results satisfying the query, calculating one or more quality metrics for the results, and obtaining a response plan for the query (step 308). Note that in this example, the super peer node 20-1 waits on results from the peer nodes 12-1 through 12-3, if any, before scheduling and sending its own results.

In response to receiving the query, the peer nodes 12-1 through 12-3 process the query by applying the query to their shared content to identify results satisfying the query, calculating one or more quality metrics for the results, obtaining a response plan for the query, and scheduling the results for response, as discussed above (steps 310-314). In this example, the results at the peer node 12-1 are high quality results, the results at the peer node 12-2 are medium quality results, and the results at the peer node 12-3 are low quality results. Thus, according to an exemplary response plan for the query, the peer node 12-1 generates a response including its results immediately, or after a short delay, and sends the response directly to the issuing peer node 14-1 (step 316). The peer node 14-1 may, at this point, display the results from the peer node 12-1 (step 318). According to the exemplary response plan for the query, since the results at the peer node 12-2 are medium quality, the peer node 12-2 sends a response including its results to the super peer node 20-2 of the issuing peer node 14-1 after a delay of, for example, a random amount of time in the range of 2-5 seconds (step 320). Lastly, according to the exemplary response plan for the query, since the results at the peer node 12-3 are low quality, the peer node 12-3 sends a response including its results to the super peer node 20-1 of the peer node 12-3 after a delay of, for example, a random amount of time in the range of 6-10 seconds (step 322).

At this point, the super peer node 20-1 aggregates the results received from the peer node 12-3 with its own results (step 324). The super peer node 20-1 then schedules, generates, and sends a response including the aggregate results to the super peer node 20-2 of the issuing peer node 14-1 according to the quality metrics of the results, or an overall quality metric for the aggregate results, and the response plan for the query (step 326). Alternatively, the super peer node 20-1 may be configured to generate and send the response including the aggregate response immediately or the response plan may state that the super peer node 20-1 is to generate and send the response including the aggregate response immediately. Note that the super peer node 20-1 may have one or more timeout periods, where there may be a different timeout period for each of a number of quality groups. After the timeout period has expired, the super peer node 20-1 may no longer accept responses. Alternatively, the super peer node 20-1 may accept the responses but provide only a statistical report describing the late responses rather than sending the late responses to the issuing peer node 14-1.

In a similar fashion, the super peer node 20-2 aggregates the results received from the super peer node 20-1 with its own results (step 328). The super peer node 20-2 then schedules, generates, and sends a response including the aggregate results to the peer node 14-1 according to the quality metrics of the results or an overall quality metric for the aggregate results and the response plan for the query (step 330). Alternatively, the super peer node 20-2 may be configured to generate and send the response including the aggregate response immediately or the response plan may state that the super peer node 20-2 is to generate and send the response including the aggregate response immediately. The peer node 14-1 then aggregates the received results with the results received in step 316 and displays the aggregate results (step 332).

The dynamic response scheme discussed herein may include an additional feature referred to herein as repeat response suppression. Building upon the example of FIG. 5, for repeat response suppression, the issuing peer node 14-1 may include a quality threshold in the query such that only results having a quality equal to or greater than the quality threshold are returned. If insufficient results are returned, the issuing peer node 14-1 may re-issue the query with a lower quality threshold. In response, only results having a quality level equal to or greater than the lower quality threshold and less than the previous quality threshold are returned. As a result, the results that were returned in response to the initial query are not returned when the query is reissued with the lower quality threshold, thereby avoiding unnecessary duplication and bandwidth consumption.

More specifically, the issuing peer node 14-1 issues the query including a quality threshold and a query identifier (ID). In response to the query, the super peer nodes 20-1 and 20-2 and the receiving peer nodes 12-1 through 12-3 identify results satisfying the query and having a quality equal to or greater than the quality threshold. The super peer nodes 20-1 and 20-2 and the receiving peer nodes 12-1 through 12-3 then return those results according to the response plan for the query and cache the query ID for later reference. If no results or insufficient results are returned to the issuing peer node 14-1, the issuing peer node 14-1 reissues the query having a lower quality threshold. This new query either has the same query ID or includes the query ID of the original query as an indicator that the new query is a reissue of the original query. In addition, the new query may include security credentials, such as a digital signature, verifying that the new query is from the issuing peer node 14-1. In response, the super peer nodes 20-1 and 20-2 and the receiving peer nodes 12-1 through 12-3 identify results satisfying the reissued query and having a quality greater than or equal to the lower quality threshold and less than the quality threshold of the original query. These results are then returned according to the response plan for the query or, alternatively, according to a new response plan for the reissued query.

The dynamic response scheme discussed herein may include an additional feature referred to herein as query cancellation. For query cancellation, if the issuing peer node 14-1 receives sufficient responses early on before all responses are received, the issuing peer node 14-1 may issue a cancellation message. The cancellation message is propagated in the same manner as the query. The cancellation message references the query using, for example, a query ID of the query and instructs the super peer nodes 20-1 and 20-2 and the receiving peer nodes 12-1 through 12-3 to send no further responses to the query.

The dynamic response scheme discussed herein may also provide for updating response plans. More specifically, building upon FIG. 5, the response plan for the query may be updated while the query is being propagated and processed by the super peer nodes 20-1 and 20-2 and the receiving peer nodes 12-1 through 12-3. Thus, for example, if the issuing peer node 14-1 provides the response plan as part of the query or in association with the query, the issuing peer node 14-1 may thereafter update the response plan by propagating an updated query or updated response plan to the super peer nodes 20-1 and 20-2 and the peer nodes 12-1 through 12-3.

Figure 6:
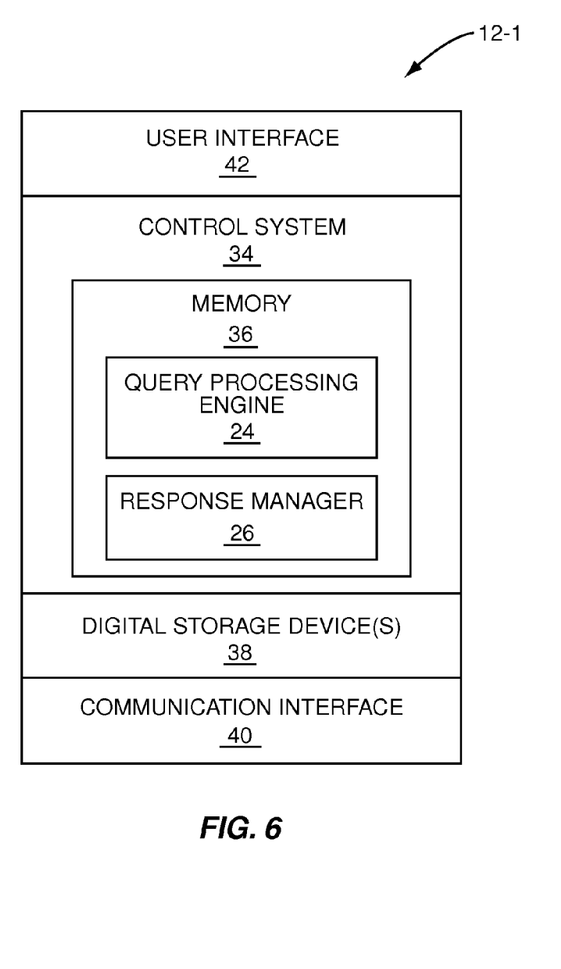
FIG. 6 is a structural block diagram of one of the peer nodes of FIG. 1 according to one embodiment of the present invention.

FIG. 6 is a block diagram of an exemplary embodiment of the peer node 12-1 of FIG. 1. This discussion is equally applicable to the other peer nodes 12-2 through 12-N₁, 14-1 through 14-N₂, 16-1 through 16-N₃, and 18-1 through 18-N₄ and the super peer nodes 20-1 through 20-4. In general, the peer node 12-1 includes a control system 34 having associated memory 36. In one embodiment, the query processing engine 24 and the response manager 26 are implemented in software and stored in the memory 36. However, the present invention is not limited thereto. Each of the query processing engine 24 and the response manager 26 may alternatively be implemented in hardware or a combination of software and hardware. The peer node 12-1 also includes one or more digital storage devices 38 such as, for example, one or more hard disk drives, internal memory, one or more removable memory cards, or the like. The one or more digital storage devices 38 may store the shared content 28 (FIG. 2). Note that the shared content 28 may alternatively be partially or completely stored in the memory 36. The peer node 12-1 also includes a communication interface 40 communicatively coupling the peer node 12-1 to the P2P network 10 (FIG. 1). In addition, the peer node 12-1 includes a user interface 42, which may include components such as, for example, one or more user input devices, a display, speakers, or the like.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   receiving, at a receiving node, a query from an originating node in a distributed network, the query including an original quality threshold;
   identifying at least one result satisfying the query;
   determining a response delay for a response to the query based on a response plan for the query and a quality for the at least one result, wherein the response plan defines different response delays based on different qualities of query results;
   generating the response to the query including the at least one result;
   sending the response after the response delay has expired;
   receiving, at the receiving node, a re-issued version of the query from the originating node having a lower quality threshold that is less than the original quality threshold;
   identifying at least one result satisfying the re-issued version of the query and having a quality greater than or equal to the lower threshold and less than the original quality threshold;
   determining a response delay for a response to the re-issued version of the query based on a response plan for the re-issued version of the query and a quality for the at least one result satisfying the re-issued version of the query;
   generating the response to the re-issued version of the query including the at least one result satisfying the re-issued version of the query; and
   sending the response to the re-issued version of the query after the response delay for the response to the re-issued version of the query has expired.

2. The method of claim 1 further comprising:
   selecting a response node to which to address the response to the query from a plurality of nodes comprising the originating node and at least one intermediary node interconnecting the originating node and the receiving node in the distributed network;
   wherein generating the response to the query comprises addressing the response to the query to the response node.

3. The method of claim 2 wherein the response plan for the query identifies one of the originating node and the at least one intermediary node as a defined response node for each of a plurality of quality ranges, and selecting the response node for the response to the query comprises:
   selecting the defined response node for one of the plurality of quality ranges corresponding to the quality of the at least one result satisfying the query as the response node for the response;
   wherein each of the plurality of quality ranges comprises at least one quality value.

4. The method of claim 2 wherein selecting the response node comprises randomly selecting the response node from the plurality of nodes comprising the originating node and the at least one intermediary node.

5. The method of claim 1 wherein the response plan for the query defines a maximum and minimum delay for each of a plurality of quality ranges, and determining the response delay for the response comprises:
   generating a random value in a range defined by the maximum and minimum delay for one of the plurality of quality ranges corresponding to the quality of the at least one result; and
   providing the random value as the response delay for the response to the query;
   wherein each of the plurality of quality ranges comprises at least one quality value.

6. The method of claim 1 wherein the response plan for the query is a common response plan for queries in the distributed network.

7. The method of claim 1 wherein the response plan for the query is a common response plan for all queries in the distributed network of a particular type, where the query is a query of the particular type.

8. The method of claim 1 further comprising obtaining the response plan for the query from a source selected from a group consisting of: the originating node and a remote source.

9. The method of claim 1 wherein the distributed network is a Peer-to-Peer (P2P) network.

10. The method of claim 1 wherein the query comprises an original quality threshold, and identifying the at least one result satisfying the query comprises identifying at least one result satisfying the query and having a quality greater than or equal to the original quality threshold.

11. The method of claim 1 further comprising canceling the response to the query if a query cancellation message is received from the originating node prior to sending the response to the query.

12. The method of claim 1 further comprising:
   receiving an updated response plan for the query prior to generating and sending the response to the query;
   wherein determining the response delay for the response to the query comprises determining the response delay for the response to the query based on the updated response plan for the query and the quality for the at least one result.

13. A method comprising:
   receiving, at a receiving node, a query from an originating node in a distributed network, the query including an original quality threshold;
   obtaining a response plan for the query that identifies one of the originating node and at least one intermediary node as a defined response node for each of a plurality of quality ranges, each of the plurality of quality ranges comprising at least one quality value;
identifying at least one result satisfying the query;
selecting a response node to which to address a response to the query from a plurality of nodes comprising the originating node and the at least one intermediary node interconnecting the originating node and the receiving node in the distributed network, wherein selecting the response node for the response comprises selecting the defined response node for one of the plurality of quality ranges corresponding to a quality of the at least one result as the response node for the response;
generating the response including the at least one result;
sending the response to the response node;
receiving, at the receiving node, a re-issued version of the query from the originating node having a lower quality threshold that is less than the original quality threshold
identifying at least one result satisfying the re-issued version of the query having a quality greater than or equal to the lower threshold and less than the original quality threshold;
selecting a response node to which to address a response to the re-issued version of the query from the plurality of nodes;
generating the response to the re-issued version of the query including the at least one result satisfying the re-issued version of the query; and
sending the response to the re-issued version of the query to the response node selected for the re-issued version of the query.

14. The method of claim 13 wherein the response plan is a common response plan for queries in the distributed network.

15. The method of claim 13 wherein the response plan is a common response plan for all queries in the distributed network of a particular type, where the query is a query of the particular type.

16. The method of claim 13 further comprising obtaining the response plan from the originating node.

17. The method of claim 13 further comprising:
receiving an updated response plan for the query prior to generating and sending the response;
wherein selecting the response node for the response comprises selecting the response node based on the updated response plan for the query.

18. The method of claim 13 wherein selecting the response node to which to address a response to the query comprises randomly selecting the response node from the plurality of nodes comprising the originating node and the at least one intermediary node.

19. The method of claim 13 wherein the distributed network is a Peer-to-Peer (P2P) network.

20. The method of claim 13 wherein identifying the at least one result comprises identifying at least one result satisfying the query and having a quality greater than or equal to the original quality threshold.

21. The method of claim 13 further comprising canceling the response to the query if a query cancellation message is received from the originating node prior to sending the response to the query.

22. A method comprising:
receiving, at a receiving node, a query from an originating node in a distributed network, the query including an original quality threshold;
identifying at least one result satisfying the query;
scheduling the at least one result for response based on a response plan for the query provided by the originating node, wherein the response plan defines different response delays based on different qualities of query results;
providing a response to the query including the at least one result as scheduled;
receiving, at the receiving node, a re-issued version of the query from the originating node having a lower quality threshold that is less than the original quality threshold;
identifying at least one result satisfying the re-issued version of the query and having a quality greater than or equal to the lower threshold and less than the original quality threshold;
determining a response delay for a response to the re-issued version of the query based on a response plan for the re-issued version of the query and a quality for the at least one result satisfying the re-issued version of the query;
generating the response to the re-issued version of the query including the at least one result satisfying the re-issued version of the query; and
sending the response to the re-issued version of the query after the response delay for the response to the re-issued version of the query has expired.

* * * * *